Patented Jan. 1, 1929.

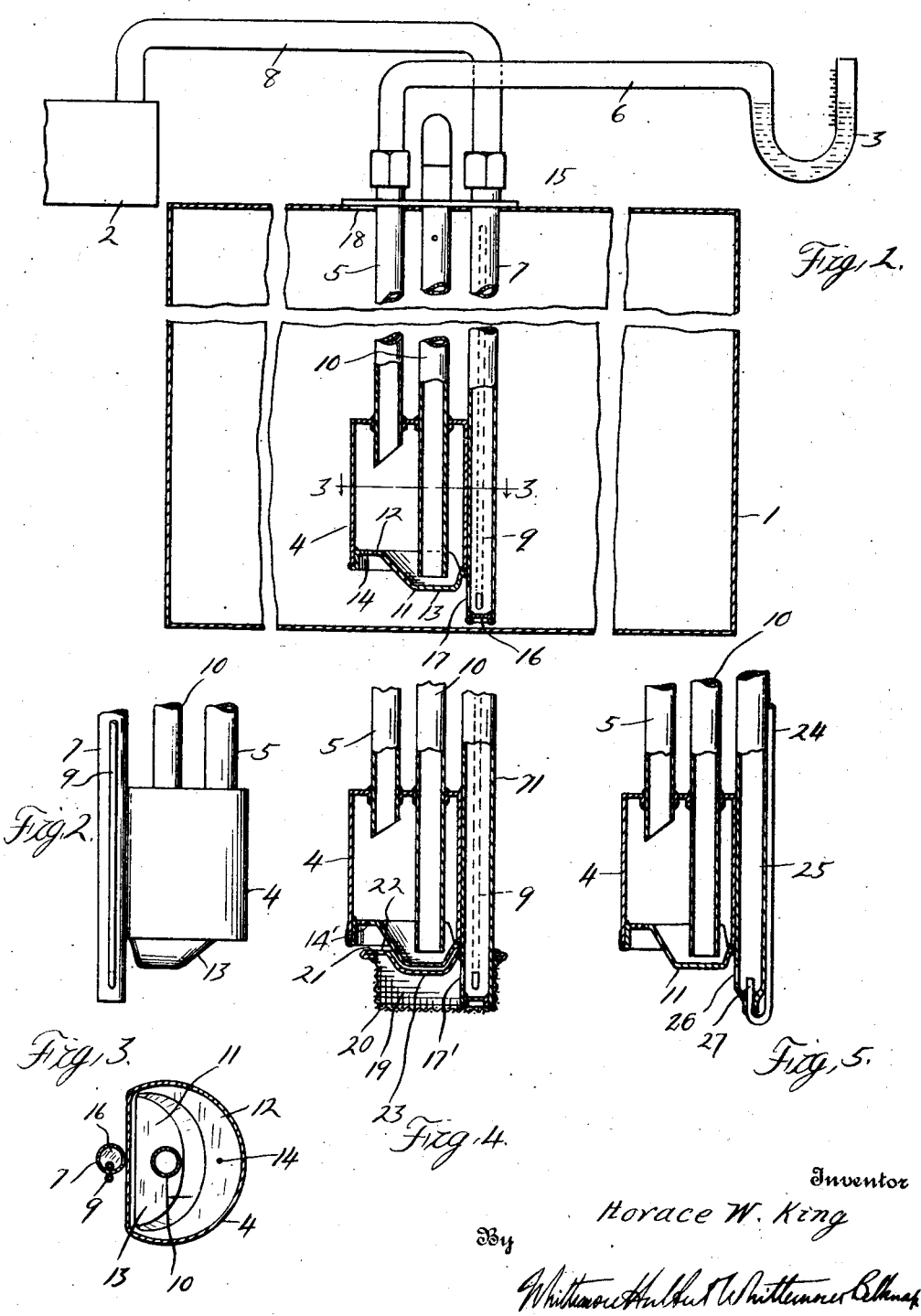

1,696,915

UNITED STATES PATENT OFFICE.

HORACE W. KING, OF BERKELEY, CALIFORNIA, ASSIGNOR TO KING-SEELEY CORPORATION, OF ANN ARBOR, MICHIGAN, A CORPORATION OF MICHIGAN.

LIQUID-DEPTH-INDICATING DEVICE.

Application filed January 31, 1927. Serial No. 164,986.

The invention relates to depth indicating devices for liquids and is designed particularly for use in motor vehicles to measure the liquid fuel, which is usually gasoline, in the supply tank. The main object of the invention is the provision of a liquid depth indicating device, the parts of which are so arranged that the device may be cheaply manufactured. Another object of the invention is the provision of a liquid depth indicating device having an improved construction of air chamber and vent tube communicating with the air chamber for avoiding the accidental forcing out or withdrawing of the indicating liquid in the pressure gage and also avoiding the forcing out of the liquid fuel in the vent tube. A further object of the invention is the provision of a screened chamber which may be attached as a unit to the suction tube for screening the liquid fuel being withdrawn from the supply tank through the suction tube. With these as well as other objects in view, the invention resides in the novel features of construction and combinations and arrangements of parts as more fully hereinafter set forth.

In the drawings:—

Figure 1 is a sectional elevation of a system including a liquid depth indicating device embodying my invention;

Figure 2 is an elevation at right angles thereto;

Figure 3 is a cross section on the line 3—3 of Figure 1;

Figure 4 is a view similar to Figure 1, showing a modified construction;

Figure 5 is a view similar to Figure 1, showing a modified construction.

In the present instance the liquid depth indicating device is associated with the gasoline supply tank and vacuum tank of a motor vehicle and is designed to measure the depth of the gasoline in the supply tank and to indicate the depth in units of quantity such as gallons.

1 is the gasoline supply tank and 2 the vacuum tank of a motor vehicle and with both of which the liquid depth indicating device is associated. 3 is the U-pressure gage of the device located on the dash of the motor vehicle in a position to be observed by the driver. 4 is the air chamber of the device located within the supply tank 1, 5 and 6 are pressure tubes extending from the air chamber to the pressure gage for transmitting the pressure of the air within the former to the latter. 7 and 8 are suction tubes extending from within the supply tank 1 to the vacuum tank 2. 9 is an air supply tube for supplying air to the device to maintain a definite quantity of air in the air chamber. 10 is the vent tube of the device for relieving the air chamber of abnormal high or low pressures and thereby avoiding either the forcing out or the withdrawal of the indicating liquid in the pressure gage 3.

The air chamber 4 is in the nature of a bell and has the bottom wall 11 which is provided with the raised portion 12 and the depressed portion 13, respectively, forming an air receiving chamber on the under side of the bottom wall and a well on the upper side thereof, the well depending below the upper part of the raised portion. This upper part is provided with the opening 14 which is preferably restricted and which places the air chamber in communication with the gasoline. The pressure tube 5 extends air tight through the top of the bell and preferably has a lower open end and an inclined opening near but below the top of the bell for placing the pressure tube in communication with the air chamber. This pressure tube extends through and is suitably mounted upon the plate 15 and its upper end is suitably connected to one end of the pressure tube 6, the other end of which is connected to one leg of the pressure gage 3. The vent tube 10 extends air tight through the top of the bell and into the well formed by the depressed portion 13 of the bottom wall 11, the lower end of the vent tube being open adjacent to but above the bottom of the well and being preferably below the lower end of the bell. This vent tube also extends through and is suitably mounted upon the plate 15 and terminates in a return-bent portion having a downwardly facing open end above the supply tank. With this arrangement of vent tube and air chamber, abnormally high pressure of the air within the air chamber is normally taken care of by the gasoline in the well and surrounding the vent tube being forced upwardly and into the vent tube. As a result, gasoline is not forced from the vent tube on to the supply tank where it collects dust under any except very excessive abnormally high pressure of air within the air chamber. However, if under very abnormal conditions, which very seldom happen, a greater pressure occurs within the air chambers, some of the air may escape upwardly through the vent tube after the gasoline in the well has been forced downwardly below the lower end of the vent tube.

The suction tube 7 extends through and is suitably secured to the cap 15 and its upper end is suitably connected to one end of the suction tube 8, the other end of which is connected to the vacuum tank 2. To provide for cheaply manufacturing the device this suction tube is formed separately from the air chamber 4, pressure tube 5 and vent tube 10. As shown, this pressure tube depends into the supply tank and extends at the side of the air chamber and its lower portion depends below the lower end of the air chamber and is closed by the plug 16. That portion of the side wall of this suction tube adjacent to and below the lower end of the air chamber is provided with the opening 17 so that gasoline upon flowing downwardly through the suction tube is directed transversely beneath the air chamber. For the purpose of keeping the cross sectional dimensions of the air chamber and pressure tube sufficiently small to pass through the opening 18 in the supply tank, that portion of the side wall of the air chamber adjacent to which the suction tube 7 extends is preferably flattened. To hold the suction tube 7 in fixed relation to the air chamber the suction tube is preferably soldered to the air chamber. The air supply tube 9 is secured to and carried by the suction tube 7 and has an open upper end which is located above the level of the gasoline within the supply tank and an open lower end within the suction tube preferably adjacent to the air chamber 4. The main portion of the air supply tube is at the side of the suction tube and preferably secured thereto as by means of solder, while the lower end portion extends through the wall of the suction tube and is turned upwardly therein terminating preferably near the opening 17. The opening in the suction tube through which the air supply tube extends is made air tight as by means of solder. With this arrangement it will be seen that the air supply tube may be assembled with the suction tube prior to assembling the suction tube with the air chamber. The lower open end of the air supply tube is so arranged that upon operation of the vacuum tank to draw gasoline from the supply tank, this gasoline will be drawn through the opening 17 of the suction tube and upwardly through the suction tube 7 and thence through the suction tube 8 to the vacuum tank. The passage of the gasoline upwardly through the suction tube 7 creates a suction effect to first draw gasoline from the air supply tube 9 and then draw air through this air supply tube. Upon stopping of the suction in the vacuum tank during the tripping of the valve mechanism thereof the gasoline in the elevated portions of the suction tube 8 and in the suction tube 7 may return or flow downwardly and then outwardly through the opening 17 in the suction tube 7 and transversely beneath the air chamber, the air being carried by this gasoline rising and collecting in the air receiving chamber formed by the raised portion 12 of the bottom wall of the air chamber, some of this collected air then passing upwardly through the restricted opening 14 into the air chamber.

In the modification shown in Figure 4, means is provided for straining the gasoline passing from the supply tank to the vacuum tank, the construction being the same in all other respects. In detail, 19 is a screened chamber which may be attached as a unit to the lower end portion of the suction tube 7' as by being soldered thereto and which incloses the opening 17' in this suction tube. This screened chamber comprises the cup-shaped screen 20 and the top 21 which is imperforate with the exception of the restricted opening 22 formed adjacent to and below the restricted opening 14' in the bottom wall of the air chamber so that the air which is carried with the gasoline passing downwardly through the suction tube 7' may pass upwardly through the opening 22 to the opening 14'. The top 21 is located adjacent to the bottom wall of the air chamber and has a depressed portion 23 which facilitates collection of the air to pass through the opening 22. The screened chamber forms a unit and may be readily secured to the suction tube as by means of solder after the other parts have been assembled and secured to each other.

With the modification shown in Figure 5 the same general arrangement of parts obtains as in Figure 1 with the exception that the air supply tube 24 is connected into the suction tube 25 in a different manner. The suction tube, however, has the opening 26 corresponding to the opening 17 but the portion of the suction tube below this opening is preferably reduced in diameter to provide an opening at its lower end of a size sufficient to receive the return bent portion 27 of the air supply tube 24, this return bent portion extending upwardly within the suction tube and having an open end preferably near the opening 26. The air supply tube 24 extends longitudinally of and is secured to the suction tube 25 as by means of solder and its upper end is open at a point normally above the level of the gasoline within the supply tank. The opening in the lower end of the suction tube through which the return bent portion of the air supply tube extends may be made air tight as by means of solder. It is apparent that with this construction a screened chamber similar to that shown in Figure 4 may be employed, if desired.

What I claim as my invention is:

1. In a liquid depth indicating device, the combination with an air chamber having a bottom wall provided with an opening for placing said chamber in communication with the liquid to be measured and with a well depending below the opening, of a vent tube having an opening above the liquid to be measured for placing the vent tube in communication with the air, said vent tube extending into the well and having an opening adjacent to the bottom thereof, a pressure gage, pressure transmitting means between said gage and chamber for placing said gage in communication with said chamber, and means for introducing air into said chamber, including a suction tube extending at the side of said chamber and having an opening in that portion of its side wall adjacent the chamber and positioned below the bottom wall of said chamber to direct the air carried in the liquid in said suction tube toward the opening in said bottom wall when the liquid is flowing downwardly through said suction tube, and an air supply tube having an opening above the level of the liquid for placing said air supply tube in communication with the air and an opening at its lower end for placing said suction tube and air supply tube in communication with each other.

2. In a liquid depth indicating device, the combination with an air chamber having a bottom wall provided with an opening for placing said chamber in communication with the liquid to be measured and with a well depending below the opening, of a vent tube having an opening above the liquid to be measured for placing said vent tube in communication with the air, said vent tube extending into the well and having an opening adjacent to the bottom thereof, a pressure gage connected with said chamber and communicating with the air contained therewithin and means for introducing air into said chamber including a suction tube extending at the side of said chamber and having an opening in that portion of its side wall adjacent the chamber and below the bottom wall of said chamber and an air supply tube having an opening above the level of the liquid to be measured for placing said air supply tube in communication with the air and an opening at its lower end for placing said suction tube and air supply tube in communication with each other 3. In a liquid depth indicating device, the combination with an air chamber having a bottom wall with one portion shaped to provide an air collecting chamber on its under side and with another portion shaped to provide a well depending below the top of said first mentioned portion, said first mentioned portion having an opening in its top for placing said chamber in communication with the liquid to be measured, of a vent tube having an opening above the liquid to be measured for placing said vent tube in communication with the air, said vent tube extending into the well and having an opening adjacent to the bottom thereof, a pressure gage connected with said air chamber and communicating with the air contained therewithin, and means for introducing air into said air chamber including a suction tube extending at the side of said chamber and having an opening in that portion of its side wall adjacent the chamber and located below the bottom wall of said air chamber, and an air supply tube having an opening above the level of the liquid for placing said air supply tube in communication with the air, and an opening at its lower end for placing said suction tube and air supply tube in communication with each other.

4. In a liquid depth indicating device, the combination with an air chamber having an opening for placing said chamber in communication with the liquid to be measured, said air chamber having a bottom wall with a depressed portion forming a well below the opening, a pressure gage, pressure transmitting means between said gage and chamber for placing said gage in communication with said chamber, means forming a passageway for air having an opening above the level of the liquid to be measured, said passageway forming means extending within the well and having an opening adjacent to the bottom thereof, and means for introducing air into said chamber.

5. In a liquid depth indicating device, the combination with an air chamber having an opening for placing said chamber in communication with the liquid to be measured, a pressure gage, pressure transmitting means between said gage and chamber for placing the same in communication with each other, and means for introducing air into said chamber including a suction tube extending at the side of said chamber and below the lower end thereof, said suction tube having an opening in that portion of its side wall adjacent the chamber and located below the lower end of said chamber, an air supply tube having an opening above the level of the liquid to be measured for placing the air supply tube in communication with the air, and an opening at the lower end for placing said suction tube and air supply tube in communication with each other, and a screened chamber extending beneath said chamber and spaced therefrom and carried as a unit by said suction tube.

6. In a liquid depth indicating device, the combination with an air chamber having a bottom wall provided with an opening for placing said chamber in communication with the liquid to be measured and with a well depending below the opening, of a vent tube having an open upper end above the liquid to be measured for placing said vent tube in communication with the air, said vent tube extending air tight downwardly through the top of said chamber and into the well and having an open lower end adjacent to the bottom of the well, a pressure gage, pressure transmitting means between said gage and chamber for placing the same in communication with each other, and means for introducing air into said chamber including a suction tube extending at the side of said chamber and below its lower end and having an opening in that portion of its side wall adjacent the chamber and below the bottom wall of said chamber and an air supply tube having an open upper end above the level of the liquid to be measured, and an open lower end within the lower portion of said suction tube, said air supply tube being mounted upon and carried by said suction tube, and a screened chamber carried as a unit by said suction tube, said screened chamber being spaced beneath said first mentioned chamber and surrounding the portion of said suction tube below said first mentioned chamber and said screened chamber including a top having an opening therein adjacent to the opening in the bottom wall of said first mentioned chamber for allowing air to pass from said screened chamber to said first mentioned chamber.

7. In a liquid depth indicating device, the combination with an air chamber having an opening for placing said chamber in communicating with the liquid to be measured, a pressure gage and pressure transmitting means between said gage and chamber for placing the same in communication with each other, of means for introducing air into said chamber including a suction tube extending at the side of said chamber and below the lower end therof, said suction tube having an opening in that portion of its side wall adjacent the chamber and located below the lower wall of said chamber and having an opening in its lower end below the first mentioned opening, and an air supply tube having an opening above the level of the liquid to be measured for placing the air supply tube in communication with the air, and a return bent portion at its lower end extending through the second mentioned opening for placing said suction tube and air supply tube in communication with each other.

8. In a liquid depth indicating device, the combination with an air chamber having an opening for placing said air chamber in communication with the liquid to be measured, a pressure gage and pressure transmitting means between said gage and chamber for placing the same in communication with each other, of means for introducing air into said chamber including a suction tube extending at the side of said chamber and below the lower end thereof, said suction tube having an opening in that portion of its side wall adjacent the chamber and located below the lower end of said chamber and having a portion below the opening therein reduced in diameter to form an opening in its lower end, and an air supply tube having an opening above the level of the liquid to be measured for placing the air supply tube in communication with the air and a return bent portion at its lower end extending through the opening in the reduced lower end of said suction tube with an open end near the first mentioned opening in said suction tube for placing said suction tube and air supply tube in communication with each other.

In testimony whereof I affix my signature.

HORACE W. KING.